United States Patent
Lee

(10) Patent No.: US 9,225,414 B2
(45) Date of Patent: Dec. 29, 2015

(54) TRANSMISSION DEVICE AND METHOD USING SPACE-FREQUENCY TRANSMISSION DIVERSITY

(75) Inventor: Dong-Kwan Lee, Yongin-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 200 days.

(21) Appl. No.: 13/142,268

(22) PCT Filed: Dec. 30, 2009

(86) PCT No.: PCT/KR2009/007999
§ 371 (c)(1),
(2), (4) Date: Jun. 24, 2011

(87) PCT Pub. No.: WO2010/077104
PCT Pub. Date: Jul. 8, 2010

(65) Prior Publication Data
US 2011/0261841 A1 Oct. 27, 2011

(30) Foreign Application Priority Data

Dec. 31, 2008 (KR) .......... 10-2008-0138904
Dec. 30, 2009 (KR) .......... 10-2009-0134781

(51) Int. Cl.
*H04B 7/06* (2006.01)
*H04W 28/06* (2009.01)

(52) U.S. Cl.
CPC .............. *H04B 7/068* (2013.01); *H04W 28/06* (2013.01)

(58) Field of Classification Search
CPC ................................... H04B 7/068
See application file for complete search history.

(56) References Cited

U.S. PATENT DOCUMENTS

| | | | |
|---|---|---|---|
| 2005/0259627 A1 | 11/2005 | Song et al. | |
| 2006/0002487 A1* | 1/2006 | Kriedte et al. | 375/267 |
| 2006/0251193 A1* | 11/2006 | Kopmeiners et al. | 375/345 |
| 2006/0252386 A1* | 11/2006 | Boer et al. | 455/101 |
| 2007/0041457 A1* | 2/2007 | Kadous et al. | 375/260 |
| 2007/0060073 A1* | 3/2007 | Boer et al. | 455/101 |
| 2007/0165521 A1 | 7/2007 | Malik et al. | |
| 2007/0202816 A1* | 8/2007 | Zheng | 455/91 |
| 2007/0230431 A1* | 10/2007 | Driesen et al. | 370/345 |
| 2009/0041151 A1* | 2/2009 | Khan et al. | 375/267 |
| 2010/0002657 A1* | 1/2010 | Teo et al. | 370/336 |
| 2010/0027696 A1* | 2/2010 | Lee et al. | 375/260 |
| 2010/0157970 A1* | 6/2010 | Gotman et al. | 370/344 |
| 2010/0278221 A1* | 11/2010 | Ql et al. | 375/219 |
| 2011/0149942 A1* | 6/2011 | Ko et al. | 370/343 |

FOREIGN PATENT DOCUMENTS

| | | |
|---|---|---|
| KR | 1020060029159 A | 4/2006 |
| KR | 1020060102185 A | 9/2006 |
| KR | 1020080041100 A | 5/2008 |

OTHER PUBLICATIONS

International Search Report for PCT/KR2009/007999 filed on Dec. 30, 2009.
Written Opinion for PCT/KR2009/007999 filed on Dec. 30, 2009.
Communication issued Feb. 26, 2015 by the Korean Patent Office in corresponding Application No. 10-2009-0134781.

\* cited by examiner

*Primary Examiner* — Jason Mattis

(57) ABSTRACT

The present invention relates to a transmission device and method using space-frequency transmission diversity in a communications system. The transmission device and method using space-frequency transmission diversity according to the present invention is characterized in that data or signals are grouped into 2 or more groups which are then transmitted through different transmission antennae by using different sub-carriers.

8 Claims, 4 Drawing Sheets

TRANSMISSION DEVICE AND METHOD USING SPACE-FREQUENCY TRANSMISSION DIVERSITY

TECHNICAL FIELD

The present invention relates generally to a transmission device and method using space-frequency transmission diversity, and more particularly to a transmission device and method using space-frequency transmission diversity which group data or signals into 2 or more groups and transmit them through different transmission antennas by using different sub-carriers.

BACKGROUND ART

In the WiBro (Wireless Broadband Internet) which is a Korean wireless portable internet standard, the OFDM (Orthogonal Frequency Division Multiplexing) is used as a signal transmission scheme so as to provide the high speed data service in radio environment when a user moves. In addition, the OFDMA (Orthogonal Frequency Division Multiple Access) which is based on the OFDM is used as a multiple access scheme so that multi users might simultaneously receive the internet service.

Recently, to meet the increasing need for transmitting a large volume of data over wireless channels at high speed, intensive research is being conducted on multiple antennas technology using several antennas, and consequently, it is possible to transmit a large volume of data at high speed by combining beam forming technology, diversity technology, multiplexing technology (e.g. MIMO (Multiple Input Multiple Output) system), etc.

Among them, the MIMO system is a representative technology, which transmits data through multiple paths using multiple transmission antennas of a transmission side (e.g. base station) and multiple reception antennas of a reception side (e.g. terminal) so as to increase transmission capacity.

However, since not all terminals can support the MIMO system in present, terminals which can not support the MIMO system do not effectively use multiple transmission antennas of a base station.

In addition, in cases of transmitting preambles and/or broadcasting messages, it is difficult to apply the MIMO system regardless of whether a terminal can support the MIMO system or not. Thus, there is a demand for new schemes that can efficiently use multiple transmission antennas of a base station in these cases.

DISCLOSURE

Technical Problem

Therefore, the present invention has been made in view of the above-mentioned problems, and it is an object of the present invention to provide new downlink transmission diversity technology for the OFDM/OFDMA system.

Specifically, it is an object of the present invention to provide a transmission device and method using space-frequency transmission diversity which group data or signals into 2 or more groups and then transmit them through different transmission antennas by using different sub-carriers.

It is another object of the present invention to provide a transmission device and method using space-frequency transmission diversity which group preambles into 2 or more preamble groups and then transmit them through different transmission antennas by using different sub-carriers.

Technical Solution

According to one aspect of the present invention, there is provided a transmission device using space-frequency transmission diversity, the device comprising: a preamble generating unit for generating preambles; a preamble grouping unit for grouping the preambles into 2 or more preamble groups; and a frame generating unit for generating a frame by matching 2 or more preamble groups with 2 or more transmission antennas.

According to another aspect of the present invention, there is provided a transmission device using space-frequency transmission diversity, the device comprising: a sub-channel mapping unit for mapping data with sub-channels which are grouped into 2 or more sub-carrier groups; and a frame generating unit for generating a frame by matching 2 or more sub-carrier groups with 2 or more transmission antennas.

According to further another aspect of the present invention, there is provided a transmission device using space-frequency transmission diversity with $N_t$ transmission antennas, the device comprising: a preamble generating unit for generating preambles; a preamble grouping unit for grouping the preambles into $N_t$ preamble groups; a sub-channel mapping unit for mapping data with sub-channels which are grouped into $N_t$ sub-carrier groups; and a frame generating unit for generating a frame by matching $N_t$ sub-carrier groups and $N_t$ preamble groups with $N_t$ transmission antennas.

According to further another aspect of the present invention, there is provided a transmission method using space-frequency transmission diversity, the method comprising: generating preambles; grouping the preambles into 2 or more preamble groups; and transmitting 2 or more preamble groups through 2 or more transmission antennas.

According to further another aspect of the present invention, there is provided a transmission method using space-frequency transmission diversity, the method comprising: grouping data into 2 or more sub-carrier groups; and transmitting 2 or more sub-carrier groups through 2 or more transmission antennas.

According to further another aspect of the present invention, there is provided a transmission method using space-frequency transmission diversity with $N_t$ transmission antennas, the method comprising: grouping data into $N_t$ sub-carrier groups and grouping preambles into $N_t$ preamble groups; and transmitting the $N_t$ sub-carrier groups and $N_t$ preamble groups through $N_t$ transmission antennas.

Advantageous Effects

The present invention can obtain space-frequency transmission diversity gain by transmitting data or signals through different transmission antennas in different frequency bandwidth, without causing interference among them.

Also, the present invention can efficiently perform OLPC (Open Loop Power Control) by using link symmetry between downlink and uplink in the TDD (Time Division Duplex) system.

DESCRIPTION OF THE DRAWINGS

The above and other aspects, features and advantages of the present invention will become more apparent from the following detailed description when taken in conjunction with the accompanying drawings in which.

MODE FOR INVENTION

Figure 1:
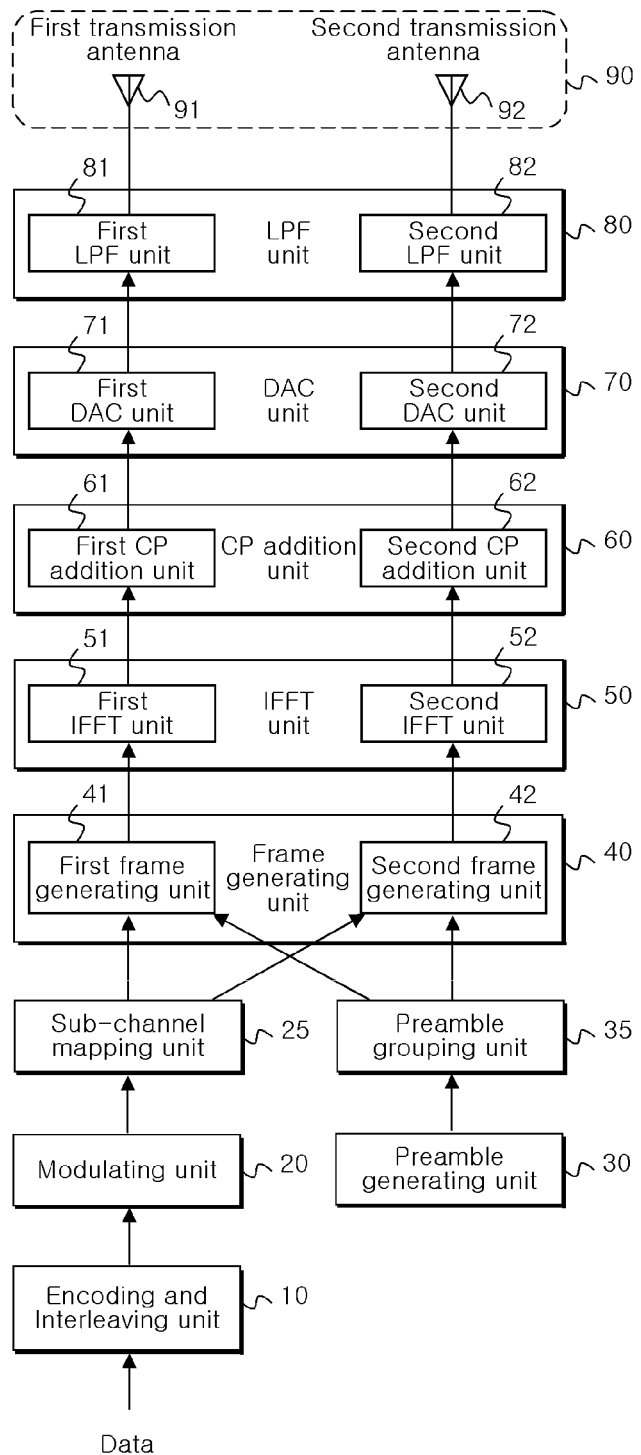
FIG. 1 is a diagram illustrating a structure of a transmission device using space-frequency transmission diversity according to an embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

Generally, the space diversity can be obtained when same data are transmitted through different wireless environment, for example, when same data are transmitted through plural antennas which are in a distance from each other. Also, the frequency diversity can be obtained when signals are transmitted through different fading environment, for example, when same data are repeatedly transmitted by using different frequencies.

The present invention proposes a transmission device and method using space-frequency transmission diversity which can obtain the space-frequency transmission diversity gain and reduce the transmission power by applying the space diversity and the frequency diversity simultaneously.

For this, first of all, it is assumed that there are $N_C$ (where $N_C$ is an integer of 2 or larger) sub-channels and $N_T$ (where $N_T$ is an integer of 2 or larger) transmission antennas for a certain OFDM system. The main idea of the present invention is to transmit different sub-carrier data through different antennas as much as possible. To do that, the present invention divides sub-carriers within each sub-channel into $N_T$ groups and then sends each group of sub-carriers through each antenna. Thus, it is desirable that the reception side performs channel estimation within each group of sub-carriers.

In current mobile WiMAX system, each sub-channel comprises 2 clusters. Therefore, if we assume that $N_T$ is 2, one cluster can be transmitted through the first transmission antenna and the other cluster can be transmitted through the second transmission antenna.

Consequently, even though the present invention does not use MIMO scheme (It is difficult to use MIMO to transmit preamble and broadcasting messages), the present invention can reduce the maximum transmission power of each transmission antenna since transmission antennas according to the present invention use about $N_T$ times less power than conventional transmission antennas. Thus, the present invention can reduce the cost of power amplifier.

In addition, the present invention can obtain transmission diversity gain which provides channel symmetry for the TDD system, without interference from other antennas. For example, if the transmission side uses one transmission antenna while the reception side uses two reception antennas, link symmetry shall be broken. Thus, OLPC (Open Loop Power Control) by terminal tends to be inaccurate. However, the present invention can increase the accuracy of OLPC (Open Loop Power Control) by terminal since link symmetry is formed by using multiple transmission antennas in the transmission side.

In addition, a transmission scheme using space-frequency transmission diversity according to the present invention can obtain similar gain as CDD (Cyclic Delay Diversity), and in particular, the advantages of the present invention compared to CDD are as follows.

First, when there is a strong LOS (line-of-sight) link, the present invention preserves the LOS link without causing channel power variation along frequency axis.

Second, the present invention does not cause excessive frequency selectiveness. Thus, channel estimation can be more accurate. It also is more preferable for band AMC (Adaptive Modulation and Coding), because the frequency response within each band should be flat to obtain good performance.

Third, when the TDD (Time Division Duplex) system is used, the present invention shows better channel reciprocity than CDD (Cycle Delay Diversity). Thus the present invention shows better performance for OLPC (Open Loop Power Control).

Hereinafter, with reference to FIGS. 1 to 4, a transmission device and method using space-frequency transmission diversity according to preferred embodiments of the present invention will now be described. For reference, in embodiments of the present invention, although two transmission antennas and two reception antennas are used, 3 or more transmission antennas can be also used.

FIG. 1 is a diagram illustrating a structure of a transmission device using space-frequency transmission diversity according to an embodiment of the present invention.

Referring to FIG. 1, a transmission device according to the present invention includes an encoding and interleaving unit 10, a modulating unit 20, a sub-channel mapping unit 25, a preamble generating unit 30, a preamble grouping unit 35, a frame generating unit 40, an IFFT (Inverse Fast Fourier Transform) unit 50, a CP (Cyclic Prefix) addition unit 60, a DAC (Digital to Analog Converter) unit 70, an LPF (Low Pass Filter) unit 80, and plural transmission antennas 90.

First, the encoding and interleaving unit 10 encodes and interleaves data to be transmitted, and the modulating unit 20 modulates data which have been encoded and interleaved.

The sub-channel mapping unit 25 groups data into 2 or more sub-carrier groups and maps them with sub-channels. In data grouping, preferably, the sub-channel mapping unit 25 groups data into sub-carrier groups of cluster unit in PUSC mode and groups data into sub-carrier groups of bin unit in band AMC mode.

Meanwhile, the preamble generating unit 30 generates preambles (i.e. preamble pilots), and the preamble grouping unit 35 groups preambles into 2 or more preamble groups. In preamble grouping, preferably, the preamble grouping unit 35 groups preambles into even numbered preamble groups on the basis of the DC sub-carrier.

The frame generating unit 40 generates frame by matching the 2 or more preamble groups and 2 or more sub-carrier groups with 2 or more transmission antennas respectively. As illustrated in FIG. 1, according to an embodiment of the present invention, the frame generating unit 40 can include the first frame generating unit 41 which generates frame to be transmitted through the first transmission antenna 91 and the second frame generating unit 42 which generates frame to be transmitted through the second transmission antenna 92. In this case, the first frame generating unit 41 generates the frame for the first transmission antenna by combining data of the first sub-carrier group sent from the sub-channel mapping unit 25 and preambles of the first preamble group sent from the preamble grouping unit 35, and the second frame generating unit 42 generates the frame for the second transmission antenna by combining data of the second sub-carrier group sent from the sub-channel mapping unit 25 and preambles of the second preamble group sent from the preamble grouping unit 35. For reference, in this case, the frame for the first transmission antenna and the frame for the second transmission antenna are matched with sub-carriers of different frequencies. Thus, the present invention can obtain frequency diversity gain.

The IFFT unit 50 performs IFFT (Inverse Fast Fourier Transform) for the frame generated from the frame generating unit 40. In this case, as illustrated in FIG. 1, the IFFT unit 50 can include the first IFFT unit 51 which performs IFFT for the frame to be transmitted through the first transmission antenna and the second IFFT unit 52 which performs IFFT for the frame to be transmitted through the second transmission antenna.

The CP addition unit 60 adds CP (Cyclic Prefix) to OFDM symbol. In this case, as illustrated in FIG. 1, the CP addition unit 60 can include the first CP addition unit 61 which adds CP to OFDM symbol for the first transmission antenna and the second CP addition unit 62 which adds CP to OFDM symbol for the second transmission antenna.

The DAC unit 70 converts digital signals to analog signals. In this case, as illustrated in FIG. 1, the DAC unit 70 can include the first DAC unit 71 which converts signals for the first transmission antenna and the second DAC unit 72 which converts signals for the second transmission antenna.

The LPF unit 80 performs low pass filtering for the converted analog signals. In this case, as illustrated in FIG. 1, the LPF unit 80 can include the first LPF unit 81 which performs low pass filtering for analog signals for the first transmission antenna and the second LPF unit 82 which performs low pass filtering for analog signals for the second transmission antenna.

Finally, the first transmission antenna 91 transmits signals of the frame for the first transmission antenna and the second transmission antenna 92 transmits signals of the frame for the second transmission antenna respectively. Thus, the present invention can obtain space diversity gain.

So far, a transmission device using space-frequency transmission diversity according to an embodiment of the present invention has been described above. For reference, since public technology can be referred, further detailed description of the encoding and interleaving unit, the modulating unit, the preamble generating unit, the IFFT unit, the CP addition unit, the DAC unit, the LPF unit, and transmission antennas will be omitted. Meanwhile, as to detailed description of scheme that groups data and/or preambles into 2 or more groups and generates frame by matching them with different antennas in relation to the sub-channel mapping unit, the preamble grouping unit, and the frame generating unit, the following description of a transmission method using space-frequency transmission diversity can be referred.

Figure 2:
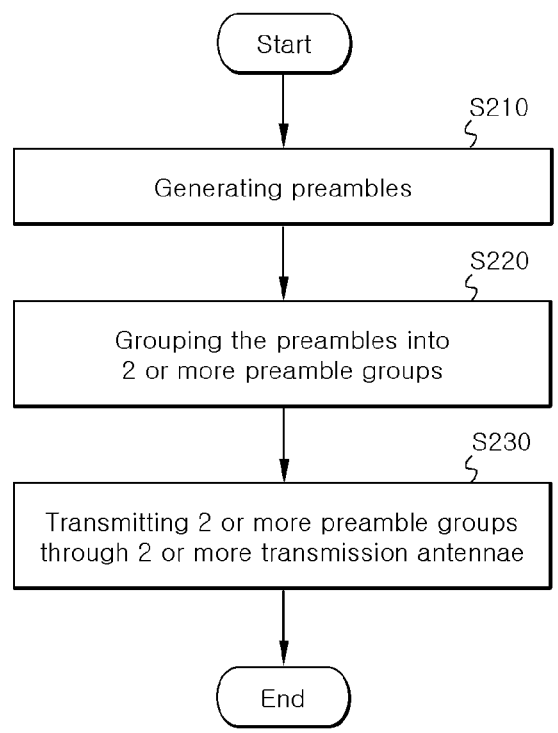
FIG. 2 is a flowchart illustrating a transmission method using space-frequency transmission diversity according to an embodiment of the present invention.

FIG. 2 is a flowchart illustrating a transmission method using space-frequency transmission diversity according to an embodiment of the present invention. And, FIG. 3 is a diagram illustrating preamble transmission diversity, with relation to FIG. 2.

Figure 3:
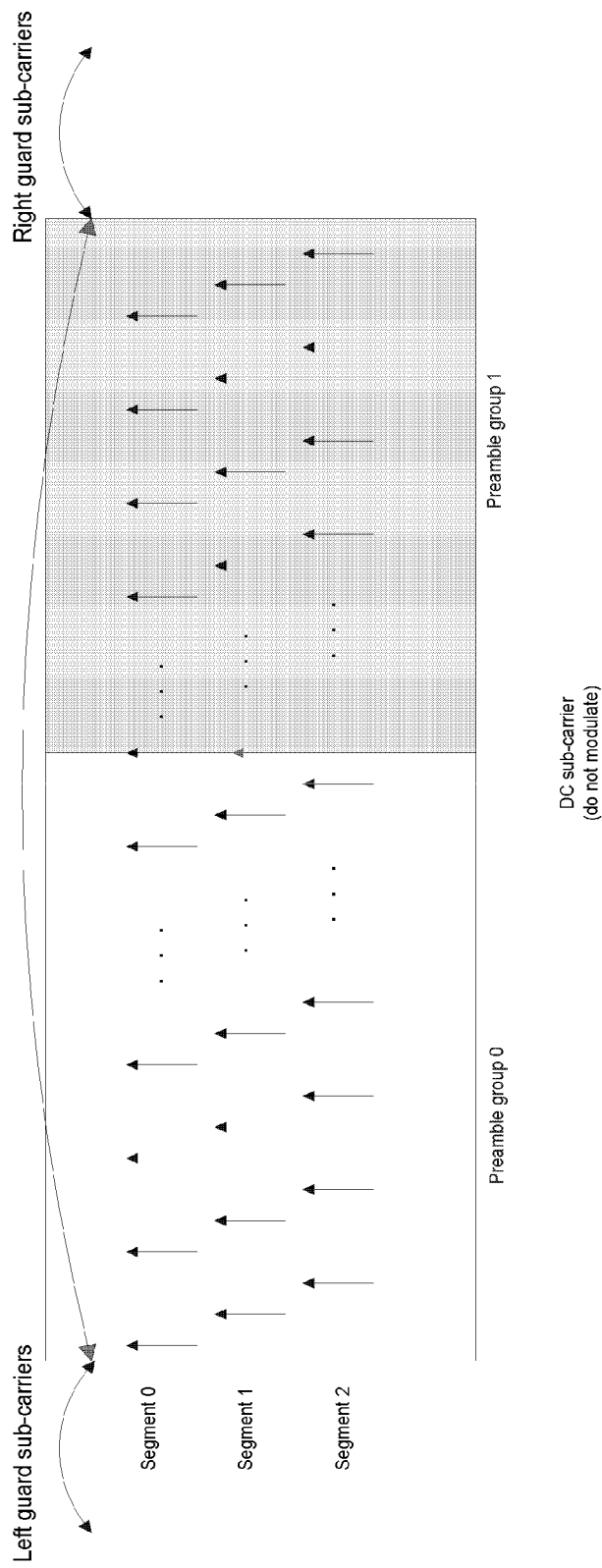
FIG. 3 is a diagram illustrating a preamble transmission diversity according to an embodiment of the present invention.

With reference to FIGS. 2 and 3, a detailed description will now be made of preamble transmission scheme using space-frequency transmission diversity.

First, in Step 210, the preamble generating unit 30 generates preambles.

In Step 220, the preamble grouping unit 35 groups preambles into 2 or more preamble groups. In this case, according to a preferred embodiment of the present invention, the preamble grouping unit 35 groups preambles into even numbered preamble groups on the basis of DC sub-carrier so as to minimize phase discontinuity in preamble sequence. For example, if there are 2 transmission antennas, the preamble grouping unit 35 groups preambles into a first preamble group (e.g. Preamble group 0 in FIG. 3) and a second preamble group (e.g. Preamble group 1 in FIG. 3) on the basis of DC sub-carrier.

In Step 230, 2 or more preamble groups are transmitted through 2 or more transmission antennas. For example, if there are 2 transmission antennas, the first preamble group is transmitted through a first transmission antenna (e.g. Antenna A) and the second preamble group is transmitted through a second transmission antenna (e.g. Antenna B).

Usually, terminal does not correlate preambles across DC sub-carrier during preamble detection. Thus, according to the present invention, continuity in physical frequency domain is preserved on preambles within each preamble group since grouping is performed on the basis of DC sub-carrier.

Meanwhile, in a preferred embodiment of the present invention, a transmission device transmits preamble groups alternatively for every predetermined number of frame(s), preferably for every frame, so as to increase OLPC performance for TDD system. For example, if there are 2 transmission antennas, on odd numbered frames, the first transmission antenna sends the first preamble group and the second transmission antenna sends the second preamble group. However, on even odd numbered frames, the first transmission antenna sends the second preamble group and the second transmission antenna sends the first preamble group.

Furthermore, if there are 4 or 8 transmission antennas, various transmission schemes can be considered. For example, following table 1 shows two methods for mapping preamble groups with transmission antennas when there are 4 transmission antennas.

TABLE 1 table for mapping preamble groups with transmission antennas

| | | Frame Counter % 4 ($N_T$) | | | |
|---|---|---|---|---|---|
| | | 0 | 1 | 2 | 3 |
| Method 1 | Ant A | group 0 | group 1 | group 2 | group 3 |
| | Ant B | group 3 | group 0 | group 1 | group 2 |
| | Ant C | group 2 | group 3 | group 0 | group 1 |
| | Ant D | group 1 | group 2 | group 3 | group 0 |
| Method 2 | Ant A | group 0 | | | group 1 |
| | Ant B | group 1 | group 0 | | |
| | Ant C | | group 1 | group 0 | |
| | Ant D | | | group 1 | group 0 |

Referring to table 1, method 1 is related to a transmission scheme that divides preambles into 4 preamble groups and transmits them through 4 transmission antennas alternately every frame. For example, preambles which are divided into two preamble group in FIG. 3 are further divided into four preamble groups with the same number of preambles. This method 1 can further reduce maximum power of each transmission antenna and obtain more degree of transmission diversity. However, method 1 may cause additional phase discontinuity among preambles, thus degrade preamble detection performance.

On the other hand, method 2 is related to a transmission scheme that divides preambles into 2 preamble groups and transmits them through 2 transmission antennas which are selected among 4 transmission antennas alternately every frame. For reference, method 2 can increase preamble detection performance because phase discontinuity among preambles occurs less. However, method 2 may increase maximum power of each transmission antenna.

Meanwhile, both methods use alternative group transmission to obtain the maximum channel reciprocity, which is very important for 4-TX/4-RX TDD system.

Figure 4:
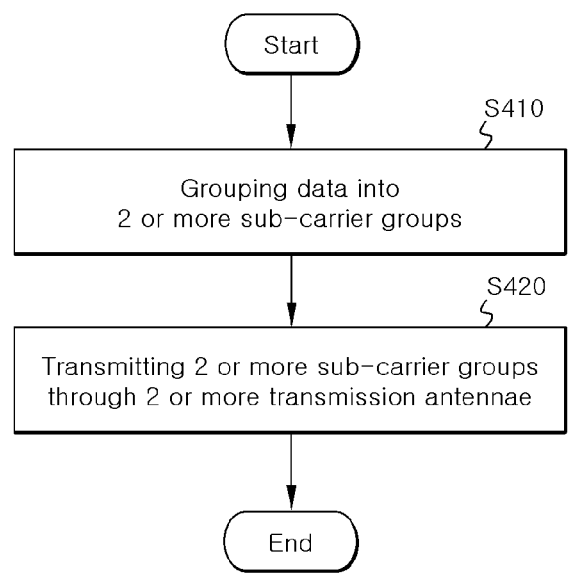
FIG. 4 is a flowchart illustrating a transmission method using space-frequency transmission diversity according to another embodiment of the present invention.

FIG. 4 is a flowchart illustrating a transmission method using space-frequency transmission diversity according to another embodiment of the present invention.

With reference to FIG. 4, in Step 410, data are grouped into 2 or more sub-carrier groups. In this case, according to a preferred embodiment of the present invention, grouping is performed according to data transmission mode to be optimized thereto. For example, data are grouped into 2 or more sub-carrier groups of cluster unit when there is PUSC transmission mode, and data are grouped into 2 or more sub-carrier groups of bin unit when there is band AMC transmission mode.

In Step 420, 2 or more sub-carrier groups are transmitted through 2 or more transmission antennas respectively.

Hereinafter, with relation to Step 410, grouping schemes according to data transmission mode will now be described.

First, when MIMO (Multiple Input Multiple Output) or beamforming is not used, grouping scheme in PUSC transmission mode will be described.

If channel estimation (e.g. pilot interpolation or averaging) occurs across clusters, phase continuity among consecutive clusters should be preserved. In this case, a transmission scheme that transmits PUSC data similar to preambles by dividing data sub-carriers into 2 sub-carrier groups (if 4 transmission antennas, 2 or 4 sub-carrier groups) whose boundary shall be the DC sub-carrier, i.e. scheme 1, can be considered. However, this scheme may cause transmission power imbalance among transmission antennas if downlink power control (e.g. power boosting) is applied. In addition, the gain of transmission diversity may be slightly reduced compare to the following scheme 2.

Scheme 2 is sending clusters of each sub-channel (i.e. sub-carrier groups within each sub-channel) through different antennas by respectively matching sub-carrier groups with clusters which constitute sun-channel. In detail, within each logical sub-channel, the first cluster (the first sub-carrier group) is transmitted through the first transmission antenna and the second cluster (the second sub-carrier group) is transmitted through the second transmission antenna. Thus, in this case, sub-carrier permutation within each major group need not be changed and cluster renumbering can also be used without change.

Thus, this scheme 2 may be very effective when channel estimation occurs separately within each cluster. Also, the scheme 2 does not cause power imbalance between transmission antennas and can obtain more diversity compared to the scheme 1.

Meanwhile, when MIMO (Multiple Input Multiple Output) or beamforming is not used, grouping scheme in bans AMC transmission mode will be described.

In band AMC transmission mode, each slot comprises two bins. Therefore, grouping in band AMC transmission mode is performed similar to grouping in PUSC transmission mode by substituting bin for cluster. For example, grouping in band AMC transmission mode is performed by dividing data into the first sub-carrier group corresponding to the first bin within each slot and the second sub-carrier group corresponding to the second bin within each slot. Then, the first sub-carrier group corresponding to the first bin is transmitted through the first transmission antenna and the second sub-carrier group corresponding to the second bin is transmitted through the second transmission antenna. Meanwhile, in another embodiment of the present invention, the first sub-carrier group and the second sub-carrier group can be transmitted through different transmission antennas every predetermined number of frame(s), preferably every frame. That is, the first sub-carrier group and the second sub-carrier group can be transmitted by alternately changing transmission antennas every predetermined number of frame(s), preferably every frame While the invention has been shown and described with reference to a certain preferred embodiment thereof, it will be understood by those skilled in the art that various changes in form and details may be made therein without departing from the spirit and scope of the invention as defined by the appended claims.

The invention claimed is:

1. A transmission method for a wireless communication system, the method comprising:
grouping pilot subcarriers into a first pilot subcarrier group and a second pilot subcarrier group;
generating a first Orthogonal Frequency Division Multiplexing(OFDM) symbol carrying at least one pilot symbol on the first pilot subcarrier group and no pilot symbol on the second pilot subcarrier group;
generating a second OFDM symbol carrying at least one pilot symbol on the second pilot subcarrier group and no pilot symbol on the first pilot subcarrier group; and
transmitting the first OFDM symbol and the second OFDM symbol simultaneously via different antennas,
wherein a first antenna combination used for transmitting the first and the second OFDM symbols in a first interval and a second antenna combination used for transmitting the first and the second OFDM symbols in a second interval are different than each other,
wherein the number of antennas is greater than the number of pilot subcarrier groups,
wherein the first pilot subcarrier group and the second pilot subcarrier group are mapped to the different antennas which are selected among transmission antennas for each interval,
wherein the second antenna combination in the second interval includes at least one antenna which is selected from the first antenna combination and at least one antenna which is not selected from the first antenna combination, and
wherein the second antenna combination in the second interval includes at least one antenna by which an OFDM symbol is not transmitted in the first interval.

2. The transmission method of claim 1, further comprising grouping data subcarriers on a subchannel into a first data subcarrier group and a second data subcarrier group,
wherein grouping pilot subcarriers comprises grouping pilot subcarriers on the subchannel into the first pilot subcarrier group and the second pilot subcarrier group,
wherein generating a first OFDM symbol comprises generating the first OFDM symbol carrying at least one pilot symbol on the first pilot subcarrier group, at least one data symbol on the first data subcarrier group, no pilot symbol on the second pilot subcarrier group, no data symbol on the second data subcarrier group,
wherein generating a second OFDM symbol comprises generating the second OFDM symbol carrying at least one pilot symbol on the second pilot subcarrier group, at least one data symbol on the second data subcarrier group, no pilot symbol on the first pilot subcarrier group, no data symbol on the first data subcarrier group.

3. The transmission method of claim 1, wherein the first pilot subcarrier group and the second pilot subcarrier group are respectively disposed on opposite sides of a direct current (DC) subcarrier.

4. The transmission method of claim 1, wherein grouping pilot subcarriers comprises grouping the pilot subcarriers into even numbered pilot subcarrier groups based on a direct current (DC) subcarrier.

5. The transmission method of claim 1, further comprising generating a third OFDM symbol carrying at least one pilot symbol on a third pilot subcarrier group and generating a fourth OFDM symbol carrying at least one pilot symbol on the fourth pilot subcarrier group, wherein grouping pilot subcarriers comprises grouping the pilot subcarriers into the first pilot subcarrier group, the second pilot subcarrier group, the third pilot subcarrier group, and fourth pilot subcarrier group, and wherein transmitting the first OFDM symbol and the second ODFM symbol comprises transmitting the first OFDM symbol, the second OFDM symbol, the third OFDM symbol, and the fourth OFDM symbol simultaneously via different antennas.

6. The transmission method of claim 1, wherein the first interval and the second interval are predetermined by a number of frames including a plurality of OFDM symbols.

7. A transmission apparatus for a wireless communication system, the transmission apparatus comprising:

a grouper configured to group pilot subcarriers into a first pilot subcarrier group and a second pilot subcarrier group;

a first Orthogonal Frequency Division Multiplexing (OFDM) symbol generator configured to generate a first OFDM symbol carrying at least one pilot symbol on the first pilot subcarrier group and no pilot symbol on the second pilot subcarrier group;

a second OFDM symbol generator configured to generate a second OFDM symbol carrying at least one pilot symbol on the second pilot subcarrier group and no pilot symbol on the first pilot subcarrier group; and a plurality of antennas, wherein the first OFDM symbol and the second OFDM symbol are transmitted simultaneously via different antennas among the plurality of antennas, wherein a first antenna combination used for transmitting the first and the second OFDM symbols in a first interval and a second antenna combination used for transmitting the first and the second OFDM symbols in a second interval are different than each other, wherein the number of antennas is greater than the number of pilot subcarrier groups, wherein the first pilot subcarrier group and the second pilot subcarrier group are mapped to the different antennas which are selected among transmission antennas for each interval, wherein the second antenna combination in the second interval includes at least one antenna which is selected from the first antenna combination and at least one antenna which is not selected from the first antenna combination, and wherein the second antenna combination in the second interval includes at least one antenna by which an OFDM symbol is not transmitted in the first interval.

8. The transmission apparatus of claim 7, wherein the first subcarrier group and the second subcarrier group are respectively disposed on opposite sides of a direct current(DC) subcarrier.

* * * * *